United States Patent [19]

Ochiai et al.

[11] Patent Number: 5,427,138

[45] Date of Patent: Jun. 27, 1995

[54] VALVE APPARATUS FOR PREVENTION OF SHOCKING TORQUE IN CLUTCH MECHANISM

[75] Inventors: Chiaki Ochiai, Chiryu; Akinari Ishikawa, Kariya, both of Japan

[73] Assignee: Aisin Seiki Kabushiki Kaisha, Kariya, Japan

[21] Appl. No.: 245,635

[22] Filed: May 18, 1994

[30] Foreign Application Priority Data

May 19, 1993 [JP] Japan .................... 5-117018

[51] Int. Cl.$^6$ ............................................. F16K 31/70
[52] U.S. Cl. .................... 137/468; 137/513.5; 251/11
[58] Field of Search ............ 137/468 I, 513.5, 62; 251/11

[56] References Cited

U.S. PATENT DOCUMENTS

| | | | |
|---|---|---|---|
| 4,171,767 | 10/1979 | Sliger | 137/513.5 X |
| 4,523,605 | 6/1985 | Ohkata | 137/62 |
| 4,574,834 | 3/1986 | Inoue | 137/513.5 X |
| 4,973,024 | 11/1990 | Homma | 251/11 |

FOREIGN PATENT DOCUMENTS

| | | | |
|---|---|---|---|
| 266892 | 11/1986 | Japan | 137/468 |
| 4-145235 | 5/1992 | Japan . | |
| 2217816 | 11/1989 | United Kingdom | 137/468 |

*Primary Examiner*—Stephen M. Hepperle
*Attorney, Agent, or Firm*—Burns, Doane, Swecker & Mathis

[57] ABSTRACT

A valve apparatus for prevention of a shocking torque in a clutch mechanism includes a housing having a chamber, the housing including an inlet port for being connected with the master cylinder and an outlet port for being connected with the release cylinder. A valve member is slidably disposed in the chamber to partition the chamber into a first chamber and a second member. The valve member includes a restricted passage connected to the first chamber and the second chamber when the valve member is closed. A first elastic member biases the valve member toward a closed position and a second elastic member biases the valve member in the counter direction of the biassing direction of the first elastic member. A wall member is disposed between the outlet port and the valve member for directing fluid flowing from the outlet port to the valve member. At least one of the first elastic member and the second elastic member is made of a shape memory so that the valve member is biassed by the first elastic member and the second elastic member so as to be opened when the temperature of a fluid flowing into the chamber is under a predetermined value and so that the valve member is biassed by the first elastic member and the second elastic member so as to be closed when the temperature of the fluid flowing into the chamber exceeds a value.

4 Claims, 3 Drawing Sheets

VALVE APPARATUS FOR PREVENTION OF SHOCKING TORQUE IN CLUTCH MECHANISM

BACKGROUND OF THE INVENTION

1. Field of the Invention

This invention relates to a valve apparatus for prevention of a shocking torque in a clutch mechanism. More particularly, the present invention relates to a valve apparatus for prevention of the shocking torque in the clutch mechanism of a vehicle.

2. Description of the Related Art

Referring to an operation of a manual transmission mounted on a vehicle, the manual transmission is initially disconnected from an engine by an operation of a clutch mechanism which is operated by a clutch pedal when a gear of the transmission is to be shifted. Later the transmission is connected with the engine by a release operation of the clutch mechanism after the gear is changed by an operation of a shift lever of the transmission. During operation of the transmission, a shocking torque is generated in the clutch mechanism by the rapid operation of the clutch mechanism when a difference between the rotation speed of the axles of the engine and the transmission is somewhat large. As a result of the shocking torque in the clutch mechanism, the engine is stopped, the vehicle is shocked and a clutch disk of the clutch mechanism is badly worn.

A conventional valve apparatus for prevention of the shocking torque in the clutch mechanism, which is disposed in a fluid conduit between a clutch master cylinder and a clutch release cylinder, is disclosed in the Japanese Patent Laid Open No. 4(1992)-145235. The valve apparatus disclosed in the prior art comprises a housing including a cylindrical chamber therein, a piston slidably disposed in the cylindrical chamber so as to partition the cylindrical chamber into a first chamber which is located near the master cylinder and a second chamber which is located near the release cylinder, a needle valve fixed to the housing and a spring forcing the piston toward the second chamber so that the piston is contacted with a plug which is fixed to the housing. The piston includes an opening connecting the first and second chambers. The needle valve extends through the opening so as to form a fluid passage between the needle valve and the opening. The passage has the largest sectional space when the piston is contacted with the plug. The farther the piston moves in the direction of the needle valve, the smaller the sectional space of the passage becomes. The valve apparatus further comprises a block mechanism. The block mechanism permits the piston to be slid toward the first chamber when the temperature of the fluid exceeds a predetermined value. On the other hand, the block mechanism prevents the piston from being slid farther than a value of the distance toward the first chamber when the temperature of the fluid is less than a value.

However referring to the valve apparatus of the prior art, the piston is directly forced by the fluid flowing into the second chamber when the fluid returns from the clutch release cylinder to the clutch master cylinder. Further the fluid passage of the valve apparatus is restricted relative to the fluid pressure which the piston receives. Therefore, variations in the viscosity of the fluid based on the temperature of the fluid and variations of a fluid speed based on a clutch pedal speed make it too difficult to provide the fluid passage with the required sectional space.

SUMMARY OF THE PRESENT INVENTION

It is an object of the present invention to provide a valve apparatus for prevention of a shocking torque in a clutch mechanism which can be easily secured a restricted passage having a sectional space which is required in spite of the variations of viscosity and fluid speed.

It is another object of the present invention to provide a valve apparatus for prevention of a shocking torque in a clutch mechanism which is convenient to be manufactured.

It is a further object of the present invention to provide a valve apparatus for prevention of a shocking torque in a clutch mechanism which is durable.

It is a further object of the present invention to provide a valve apparatus for prevention of a shocking torque in a clutch mechanism which is simple in structure and small in size.

It is a further object of the present invention to provide a valve apparatus for prevention of a shocking torque in a clutch mechanism which is low in cost.

To achieve the above mentioned objects, a valve apparatus for prevention of a shocking torque in a clutch mechanism for being disposed in a conduit between a clutch master cylinder and a clutch release cylinder in accordance with this invention comprises a housing including a chamber therein, the housing including an inlet port for being connected with the master cylinder and an outlet port for being connected with the release cylinder, a valve member slidably disposed in the chamber so as to partition the chamber into a first chamber and a second chamber, the valve member including a restricted passage connected to the first chamber and the second chamber when the valve member is closed, a first elastic member biassing the valve member so as to be closed, a second elastic member biassing the valve member in the counter direction of the biassing direction of the first elastic member and a wall member disposed between the outlet port and the valve member. At least one of the first elastic member and the second elastic member is made of a shape memory alloy in order that the valve member is biassed by the first elastic member and the second elastic member so as to be opened when the temperature of a fluid flowing into the chamber is under a predetermined value and that the valve member is biassed by the first elastic member and the second elastic member so as to be closed when the temperature of the fluid flowing into the chamber is exceeds a value.

BRIEF DESCRIPTION OF THE DRAWINGS

The features and advantages of the valve apparatus for prevention of a shocking torque in a clutch mechanism according to the present invention will be more clearly appreciated from the following description in conjunction with the accompanying drawings wherein:

FIG. 3 (b) is a bottom view of a valve member of a valve apparatus for prevention of a shocking torque in a clutch mechanism of the present invention.

DETAILED DESCRIPTION OF PREFERRED EMBODIMENT OF THE INVENTION

Figure 1:
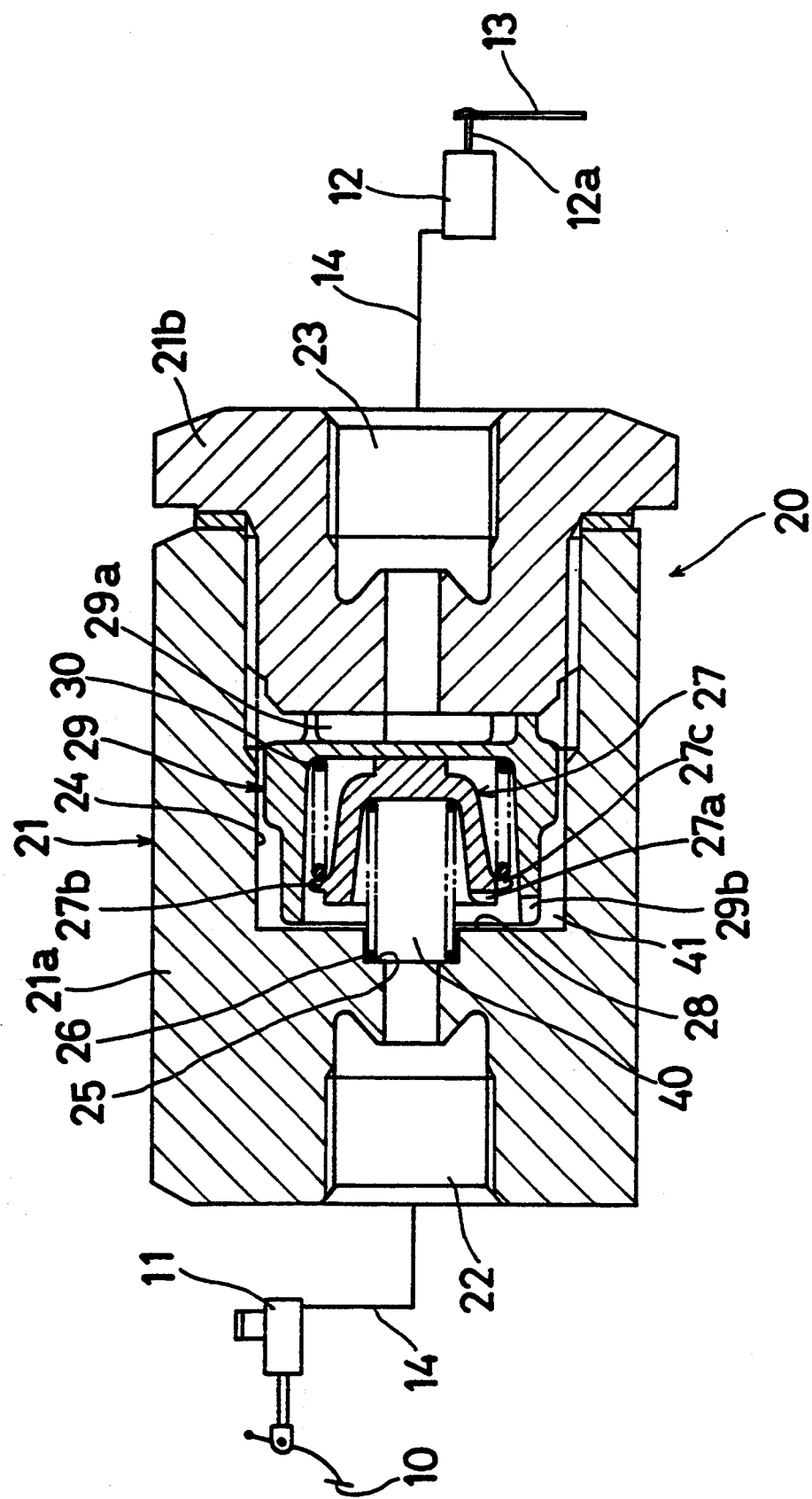
FIG. 1 is a sectional view of a valve apparatus for prevention of a shocking torque in a clutch mechanism of the present invention when a valve member is opened.
Figure 2:
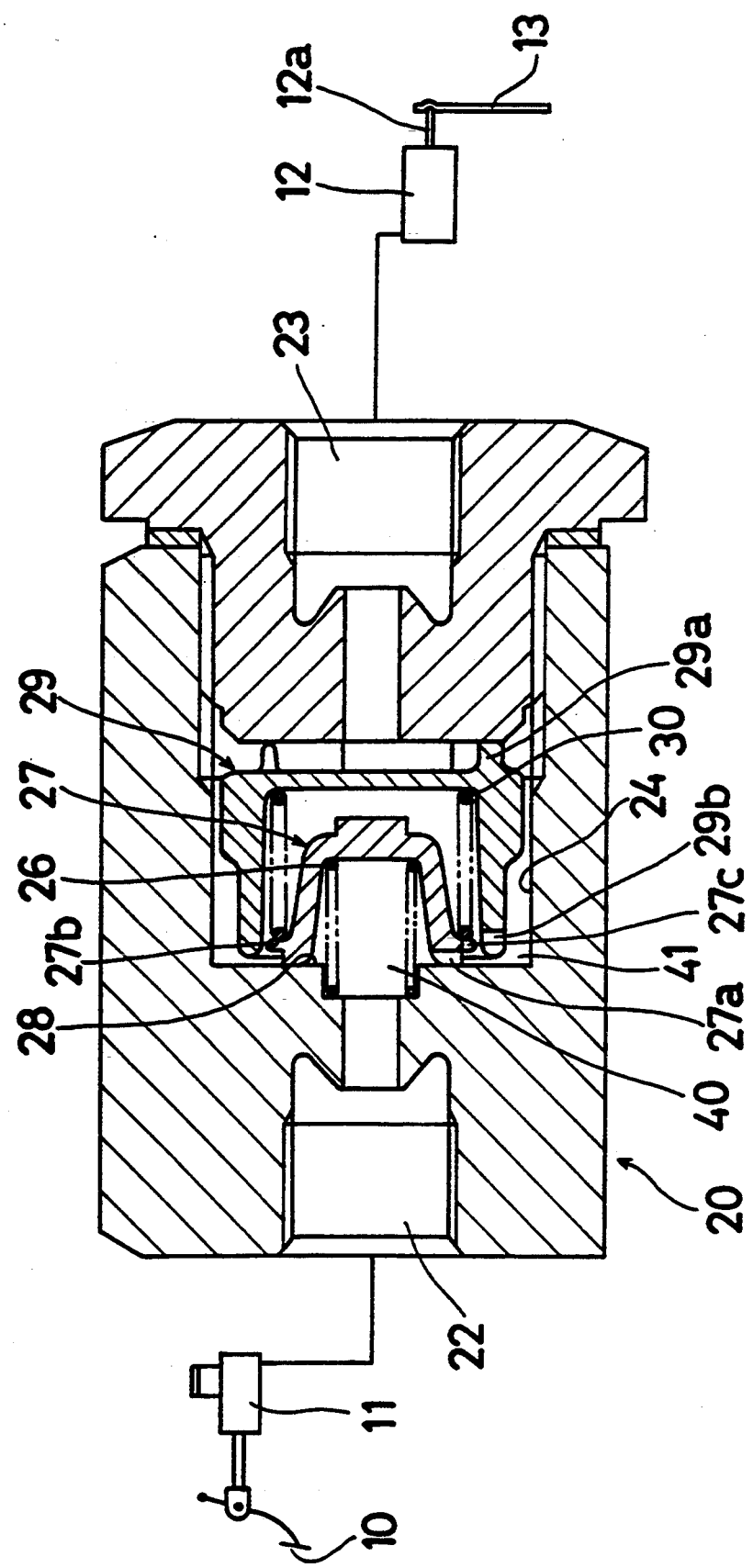
FIG. 2 is a sectional view of a valve apparatus for prevention of a shocking torque in a clutch mechanism of the present invention when a valve member is closed.
Figure 3A:
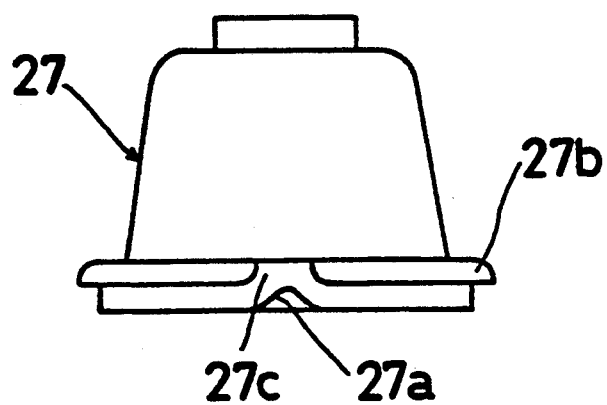
FIG. 3 (a) is a side view of a valve member of a valve apparatus for prevention of a shocking torque in a clutch mechanism of the present invention.
Figure 3B:
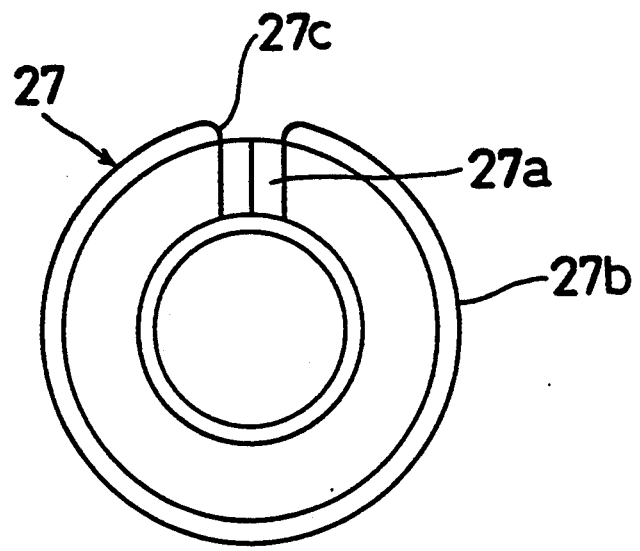

Referring to the FIGS. 1 and 2, a sectional view of a valve apparatus 20 of the invention is shown in the FIG. 1 when a valve member 27 is opened, a sectional view of the valve apparatus 20 of the invention is shown in the FIG. 2 when the valve member 27 is closed. The valve apparatus 20 is disposed on a conduit 14 between a clutch master cylinder 11 and a clutch release cylinder 12. A clutch pedal 10 is connected with the clutch master cylinder 11. A release fork 13 is connected with the clutch release cylinder 12 through an output rod 12a. The valve apparatus 20 includes a housing 21 formed with a body 21a and a plug 21b. The body 21a and the plug 21b are adapted to be screwed to each other. Each of the body 21a and the plug 21b includes an inlet port 22 and an outlet port 23 respectively. The inlet port 22 is connected with the clutch master cylinder 11 through the conduit 14 and the outlet port 23 is connected with the clutch release cylinder 12 through the conduit 14. The body 21a further includes a cylindrical chamber 24 therein which connects the inlet port 22 and the outlet port 23. The valve member 27 is disposed in the cylindrical chamber 24 so as to separate the cylindrical chamber 24 into a first chamber 40 and a second chamber 41. A second spring 26 is disposed between the valve member 27 and a shoulder portion 25 of the body 21a so as to bias the valve member 27 apart from a valve seat portion 28 of the body 21a (bias the valve member 27 in the right direction shown in the FIG. 1). The valve member 27 has a groove 27a which forms a restricted passage with the valve seat portion 28. The valve member 27 further includes a flange portion 27b around an outer circumference thereof and a concave portion 27c through which fluid flows. The concave portion 27c has an opening space (shown in the FIG. 3 (b)) which is larger than a sectional space of the groove 27a (shown in the FIG. 3 (a)).

A retainer 29 as a wall member is disposed between the valve member 27 and the plug 21b. The retainer 29 is possesses a cup-shaped configuration so as to cover the valve member 27. Further a first spring 30 which is made of a shape memory alloy is disposed between the valve member 27 and the retainer 29. The first spring 30 includes an elastic force which is smaller than that of the second spring 26 so that the valve member 27 may be contacted with the retainer 29 when the temperature of the first spring 30 is below a predetermined value. However, as shown in the FIG. 2 the first spring 30 is provided to bias the valve member 27 to contact the valve seat 28 (bias the valve member 27 in the left direction shown in the FIG. 2) against the elastic force of the second spring 26 when the temperature of the first spring 30 exceeds a value by an increase of temperature of the fluid flowing into the cylindrical chamber 24. The retainer 29 includes a plurality of projection portions 29a which contact the plug 21b. The retainer 29 further includes a slot 29b through which fluid flows. The slot 29a has a sectional space which is larger than that of the groove 27a.

In accordance with the invention, the second spring 26 may be made of the shape memory alloy instead of the first spring 30. In this case, when the temperature of the second spring 26 is under a value, the elastic force of the second spring 26 is larger than that of the first spring 30. Further, the second spring 26 imparts an elastic force which is smaller than that of the first spring 30 when the temperature of the second spring 26 exceeds a value.

An operation of the valve apparatus 20 will be described hereinafter. When the temperature of the first spring 30 is under a value, the valve member 27 is forced by the second spring 26 to be spaced from the valve seat portion 28 (Open Condition) as shown in the FIG. 1. When the clutch pedal 10 is operated by a driver of the vehicle, a piston (not shown in the FIGURES) of the clutch master cylinder 11 is pushed so that the fluid in the clutch master cylinder 11 is pumped out of the clutch master cylinder 11. The fluid flows into the first chamber 40 of the valve apparatus 20 through the conduit 14 and the inlet port 22. Later the fluid flows between the valve member 27 and the valve seat 28 and into the clutch release cylinder 12 through the second chamber 41, the outlet port 23 and the conduit 14. A piston (not shown in the FIGURES) in the clutch release cylinder 12 is forced by the fluid pressure so that the clutch release fork 13 is biassed in the right direction shown in the FIG. 1. Therefore, a clutch mechanism (not shown in the FIGURES) is disconnected. At this time, the gear of a transmission (not shown in the FIGURES) is changed by an operation of a shift lever (not shown in the FIGURES).

After the shift operation of the transmission, when the clutch pedal 10 is released by the driver, the clutch release fork 13 is returned toward the left direction shown in the FIG. 1 by a diaphragm spring (not shown in the FIGURES) of the clutch mechanism. Therefore, the piston of the clutch release cylinder 12 is also forced in the left direction shown in the FIG. 1 by the clutch release fork 13. The fluid in the clutch release cylinder 12 is returned to the outlet port 23 of the valve apparatus 20 through the conduit 14 by the movement of the piston of the clutch release cylinder 12. The fluid returned to the outlet port 23 flows into the second chamber 41 through the projection portions 29a. Later the fluid flows between the valve member 27 and the valve seat 28, and is consequently returned to the master cylinder 11 through the first chamber 40, the inlet port 22 and the conduit 14. Because the viscosity of the fluid is high, the fluid is slowly returned from the clutch release cylinder 12 to the clutch master cylinder 11 through the valve apparatus 20. Therefore, the shocking torque is not generated in the clutch mechanism.

Further, when the clutch pedal 10 is rapidly released, the fluid pressure pumped out of the clutch release cylinder 12 pushes the retainer 29 against the elastic force of the first spring 30 and the second spring 26 in the left direction shown in the FIG. 1 so that the retainer 29 contacts the body 21a. Therefore, the valve member 27 is covered with the retainer 29. As the fluid pressure directly collides with the valve member 27, the valve member 27 is not forced in the left direction shown in the FIG. 1 into contact with the valve seat 28. At this time, since the sectional space of the slot 29b in the retainer 29 is larger than that of the groove 27a, the fluid is not restricted through the slot 29b.

When the temperature of the first spring 30 exceeds a value by the increase of the temperature of the fluid in the cylindrical chamber 24, the valve member 27 is forced by the first spring 30 so as to contact the valve seat portion 28 (Close Condition) as shown in the FIG. 2. When the clutch pedal 10 is operated by the driver of the vehicle, the fluid in the clutch master cylinder 11 is pumped out of the clutch master cylinder 11. The fluid flows into the first chamber 40 of the valve apparatus 20 through the conduit 14 and the inlet port 22. At this time the pressure fluid pushes the valve member 27 in the right direction shown in the FIG. 2 against the elastic force of the first spring 30 so that the valve member 27 is spaced from the valve seat 28. The fluid flows from the first chamber 40 into the second chamber 41 between the valve member 27 and the valve seat 28. Later the fluid flows into the clutch release cylinder 12 through the outlet port 23 and the conduit 14. As the operations of the clutch mechanism and the transmission are already described in the above, the explanation of the operations of the clutch mechanism and the transmission will be omitted to be described.

After the shift operation of the transmission, when the clutch pedal 10 is released by the driver, the clutch release fork 13 is returned the left direction shown in the FIG. 2 by the diaphragm spring of the clutch mechanism. Therefore, the piston of the clutch release cylinder 12 is also forced in the left direction shown in the FIG. 2 by the clutch release fork 13. The fluid in the clutch release cylinder 12 is returned to the outlet port 23 of the valve apparatus 20 through the conduit 14 by the movement of the piston of the clutch release cylinder 12. The fluid returned to the outlet port 23 flows into the second chamber 41 between the projection portions 29a. Since the valve member 27 is in contact with the valve seat 28 by the elastic force of the first spring 30, the fluid flows from the second chamber 41 into the first chamber 40 through the groove 27a. Later the fluid is returned from the first chamber 40 to the master cylinder 11 through the inlet port 22 and the conduit 14. Because the fluid flows into the clutch master cylinder 11 through the groove 27a, the fluid is slowly returned from the clutch release cylinder 12 to the clutch master cylinder 11 through the valve apparatus 20. Therefore, the shocking torque is not generated in the clutch mechanism.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A valve apparatus for prevention of a shocking torque in a clutch mechanism comprising:
    a housing in which is provided a chamber, the housing including an inlet port for being connected to a clutch master cylinder and an outlet port for being connected to a clutch release cylinder;
    a valve member slidably disposed in the chamber to partition the chamber into a first chamber and a second chamber, the valve member including a restricted passage connecting the first chamber and the second chamber when the valve member is closed;
    a first elastic member biassing the valve member to be closed;
    a second elastic member biassing the valve member in a direction counter to a biassing direction of the first elastic member; and
    a wall member disposed between the outlet port and the valve member for leading fluid flowing from the outlet port to the valve member in a generally perpendicular direction relative to a sliding direction of the valve member, at least one of the fist elastic member and the second elastic member being made of a shape memory alloy so that the valve member is biassed open by the first elastic member and the second elastic member when a temperature of a fluid flowing into the chamber is under a predetermined value and so that the valve member is biassed by the first elastic member and the second elastic member to be closed when the temperature of the fluid flowing into the chamber exceeds a value.

2. A valve apparatus for prevention of a shocking torque in a clutch mechanism as recited in claim 1, wherein the first elastic member is made of the shape memory alloy.

3. A valve apparatus for prevention of a shocking torque in a clutch mechanism as recited in claim 1, wherein the wall member includes a slot having a sectional space which is larger than that of the restricted passage of the valve member.

4. A valve apparatus for prevention of a shocking torque in a clutch mechanism as recited in claim 1, wherein the valve member includes a flange portion engaged with the first elastic member, the valve member further includes a concave portion on the flange portion.

* * * * *